US012799866B2

(12) United States Patent
Li et al.

(10) Patent No.: US 12,799,866 B2
(45) Date of Patent: Nov. 17, 2026

(54) METHOD AND APPARATUS FOR FIRE VENTILATION AND SMOKE EVACUATION IN RUNNING TRAIN TUNNEL

(71) Applicant: CHINA ACADEMY OF SAFETY SCIENCE AND TECHNOLOGY, Beijing (CN)

(72) Inventors: Jian Li, Beijing (CN); Congling Shi, Beijing (CN); Guolin Liu, Beijing (CN); Fei Ren, Beijing (CN); Li He, Beijing (CN); Xiaodong Qian, Beijing (CN); Xuan Xu, Beijing (CN); Jiehong Shi, Beijing (CN); Chen Zhao, Beijing (CN)

(73) Assignee: CHINA ACADEMY OF SAFETY SCIENCE AND TECHNOLOGY, Beijing (CN)

( * ) Notice: Subject to any disclaimer, the term of this patent is extended or adjusted under 35 U.S.C. 154(b) by 413 days.

(21) Appl. No.: 18/545,240

(22) Filed: Dec. 19, 2023

(65) Prior Publication Data

US 2024/0200453 A1 Jun. 20, 2024

(30) Foreign Application Priority Data

Dec. 19, 2022 (CN) ........................ 202211635340.2

(51) Int. Cl.

| | |
|---|---|
| ***E21F 1/00*** | (2006.01) |
| ***B61L 25/02*** | (2006.01) |
| ***G08B 17/10*** | (2006.01) |

(52) U.S. Cl.

CPC ........... *E21F 1/003* (2013.01); *B61L 25/021* (2013.01); *G08B 17/10* (2013.01)

(58) Field of Classification Search

CPC ........ E21F 1/003; B61L 25/021; G08B 17/10; A62C 3/0221

See application file for complete search history.

(56) References Cited

FOREIGN PATENT DOCUMENTS

KR 101587275 B1 * 1/2016 ................ E21F 1/08

* cited by examiner

*Primary Examiner* — Vivek K Shirsat
*Assistant Examiner* — Michael James Giordano

(57) ABSTRACT

A method and apparatus for fire ventilation and smoke evacuation in a running train tunnel are provided. The method includes: acquiring a traveling position of the train and a fire position on the train detected by the fire positioning device; predicting all possible stop positions of the train next in various sections of a subway tunnel according to a traveling direction and the traveling position of the train; according to the fire position, listing working state options of the air supply and smoke evacuation subsystems at both ends of each stop position, analyzing each working state option, and screening out a target air supply and smoke evacuation subsystem which only carries out smoke evacuation or air supply control from all the air supply and smoke evacuation subsystems; and performing linkage control on the target air supply and smoke evacuation subsystem.

16 Claims, 4 Drawing Sheets

METHOD AND APPARATUS FOR FIRE VENTILATION AND SMOKE EVACUATION IN RUNNING TRAIN TUNNEL

TECHNICAL FIELD

The present disclosure relates to the technical field of rail traffic, and in particular to a method and apparatus for fire ventilation and smoke evacuation in a running train tunnel.

BACKGROUND

With the continuous development and improvement of the urban underground transportation network, subway tunnels with long intervals are generally built in express subways, express intercity railways and express suburban railways in cities. Train fires in such subway tunnels are one of the important challenges in train operation and management. Due to the particularity of the tunnel position and the limitation of the tunnel space, when a train fire occurs, the closed tunnel environment will cause personnel evacuation and rescue, as well as smoke evacuation and fire extinguishing in the tunnel are extremely difficult. In order to reduce the casualties caused by fire, it is necessary to configure a good ventilation and smoke evacuation system and smoke evacuation mode for subway tunnels with long intervals.

For the traditional single-hole subway interval tunnel, a longitudinal ventilation and smoke evacuation mode is mainly adopted for a fire and smoke prevention organization. In case of fire during train running, the train is controlled as much as possible to travel to a forward station where evacuation of passengers, smoke removal and fire extinguishing are organized. When the train on fire stops at the station, the ventilation system of the station tunnel is used for smoke evacuation, and the fans of the interval tunnels at both ends of the station assist in smoke evacuation. At the same time, the station system is linked to start the platform fire ventilation and smoke evacuation mode. When the train on fire stops in the interval tunnel, smoke is evacuated according to the predetermined fire smoke evacuation mode in the tunnel, and fresh air is sent to induce passengers to evacuate. The smoke evacuation direction is always opposite to the evacuation direction of most passengers. For example, when a fire breaks out at the head of a train, the ventilation and smoke evacuation fan in the tunnel in the train advancing direction is opened to evacuate smoke, and the ventilation and smoke evacuation fan in the tunnel in the train tail direction is opened to supply air, so as to form longitudinal airflow from tail to head in the tunnel to ensure that smoke flows in the head direction and passengers are evacuated in the tail direction. When there is a fire at the tail of the train, the ventilation and smoke evacuation fan in the tunnel in the train advancing direction is opened to replenish air, and the ventilation and smoke evacuation fan in the tunnel in the train tail direction is opened to evacuate smoke, so as to form longitudinal airflow from head to tail to ensure that smoke flows in the tail direction and passengers are evacuated in the head direction.

The above longitudinal ventilation and smoke evacuation mode is applicable to short distance interval tunnels, but is not applicable to fires occurring on running trains in long interval subway tunnels, and the details are as follows:

(1) For a long-interval subway tunnel, due to the long length of the subway tunnel, during subway operation, there may be situations where two or even more trains are simultaneously running within a subway tunnel. If the conventional longitudinal ventilation and smoke evacuation mode is adopted, when the train stops in the subway tunnel due to the fire at the tail of the previous train, if the ventilation and smoke evacuation fan in the head direction supplies air and the ventilation and smoke evacuation fan in the tail direction evacuates smoke, the latter train or even multiple trains behind may be shrouded in smoke, which is not conducive to personnel safety.

(2) When the train fire occurs in the subway tunnel, the existing ventilation and smoke evacuation mode is set as follows: the train is controlled to travel to the station to evacuate smoke, and during traveling of the train, smoke evacuation is not carried out through the subway tunnel, and when the train cannot travel to the station, i.e., stops inside the subway tunnel, according to information provided by field workers, the position of the train fire is judged, and then corresponding fans at both end stations are manually started for air supply and smoke evacuation.

It is found in practical applications that, the ventilation and smoke evacuation solution for train fires described above, whether after the train is controlled to travel to the station, then the corresponding air supply and smoke evacuation mode is manually started, or after the train is confirmed to stop at the tunnel, and the fire position is manually judged, then the corresponding air supply and smoke evacuation mode is manually started, has a significant disadvantage that the smoke evacuation mode is started late, which is not conductive to smoke and personnel evacuation.

SUMMARY

The present disclosure provides a method and apparatus for fire ventilation and smoke evacuation in a running train tunnel for solving the current problem that it is difficult to timely and efficiently perform ventilation and smoke evacuation control for fire occurring in a running train in a long-interval subway tunnel.

The present disclosure provides a method for fire ventilation and smoke evacuation in a running train tunnel, including: S01, in a case where a fire positioning device detects a fire of a train, acquiring a traveling position of the train and a fire position on the train detected by the fire positioning device;

- S02, predicting all possible stop positions of the train next in various sections of a subway tunnel according to a traveling direction and the traveling position of the train;
- S03, according to the fire position, one the basis of a control principle of carrying out smoke evacuation by an air supply and smoke evacuation subsystem in a positive direction of a fire point and carrying out air supply by an air supply and smoke evacuation subsystem in an opposite direction of the fire point, listing working state options of the air supply and smoke evacuation subsystems at both ends of each stop position, analyzing each working state option, and screening out a target air supply and smoke evacuation subsystem which only carries out smoke evacuation or air supply control from all the air supply and smoke evacuation subsystems; and
- S04, performing linkage control on the target air supply and smoke evacuation subsystem according to the working state option corresponding to the target air supply and smoke evacuation subsystem;

wherein a subway tunnel between two adjacent stations is sequentially divided into a plurality of sections, each section is provided with a fire positioning device and an air supply and smoke evacuation subsystem, and the target air supply and smoke evacuation subsystem is any one of the plurality of air supply and smoke evacuation subsystems.

According to the present disclosure, there is provided a method for fire ventilation and smoke evacuation in a running train tunnel, further including: in a case where the next fire positioning device along the traveling direction detects the passage of the train, performing linkage control on each air supply and smoke evacuation subsystem again in the order of S01 to S04.

According to the present disclosure, there is provided a method for fire ventilation and smoke evacuation in a running train tunnel, S03 further includes:

listing the working state options of the ith air supply and smoke evacuation subsystem when the train is at the jth stop position, both i and j being integers, and i≥1, j≥1; wherein, the working state options include smoke evacuation, air supply and closing;

in a case where at least one option of smoke evacuation is contained in all the working state options of the ith air supply and smoke evacuation subsystem, and no option of air supply is contained, performing linkage control on the ith air supply and smoke evacuation subsystem as the target air supply and smoke evacuation subsystem;

in a case where at least one option of air supply is contained in all the working state options of the ith air supply and smoke evacuation subsystem, and no option of smoke evacuation is contained, performing linkage control on the ith air supply and smoke evacuation subsystem as the target air supply and smoke evacuation subsystem; and in a case where the options of air supply and smoke evacuation are contained in all the working state options of the ith air supply and smoke evacuation subsystem, or in a case where all the working state options of the ith air supply and smoke evacuation subsystem are closed, closing the ith air supply and smoke evacuation subsystem.

According to the present disclosure, there is provided a method for fire ventilation and smoke evacuation in a running train tunnel, further including: assigning the working state options of the ith air supply and smoke evacuation subsystem when the train is at the jth stop position according to the category of the working state options; and analyzing assigned results of the working state options to determine a target air supply and smoke evacuation subsystem among the air supply and smoke evacuation subsystems.

According to the present disclosure, there is provided a method for fire ventilation and smoke evacuation in a running train tunnel, assigning the working state options of the ith air supply and smoke evacuation subsystem when the train is at the jth stop position includes:

setting the assigned values of the working state options of the ith air supply and smoke evacuation subsystem when the train is at the jth stop position to be $q_{i,j}$;

wherein, when the working state option is air supply, $q_{i,j}$=−K; when the working state option is smoke evacuation, $q_{i,j}$=K; when the working state option is closing, $q_{i,j}$=0, K is greater than 0.

According to the present disclosure, there is provided a method for fire ventilation and smoke evacuation in a running train tunnel, analyzing the assigned results of the working state options to determine the target air supply and smoke evacuation subsystem among the air supply and smoke evacuation subsystems includes:

in a case where the assigned values $q_{i,j}$ of all the working state options of the ith air supply and smoke evacuation subsystem are not less than 0, and are not all 0, performing smoke evacuation control on the ith air supply and smoke evacuation subsystem;

in a case where the assigned values $q_{i,j}$ of all the working state options of the ith air supply and smoke evacuation subsystem are not greater than 0, and are not all 0, performing air supply control on the ith air supply and smoke evacuation subsystem; and controlling the ith air supply and smoke evacuation subsystem to be closed when at least one is greater than 0 and at least one is less than 0 occurs among the assigned values $q_{i,j}$ of all the working state options of the ith air supply and smoke evacuation subsystem, or when the assigned values $q_{i,j}$ of all the working state options of the ith air supply and smoke evacuation subsystem are all 0.

According to the present disclosure, there is provided a method for fire ventilation and smoke evacuation in a running train tunnel, further including: after a preset time, if the next fire positioning device in the traveling direction does not detect the passing of the train, controlling the first air supply and smoke evacuation subsystem to carry out smoke evacuation in a positive direction of a fire point and controlling the first air supply and smoke evacuation subsystem to carry out air supply in an opposite direction of the fire point, while maintaining the current air supply and smoke evacuation state of each of the air supply and smoke evacuation subsystems.

According to the present disclosure, there is provided a method for fire ventilation and smoke evacuation in a running train tunnel, the preset time is determined according to the length of the section of the train where the fire occurs and the running speed of the train.

The present disclosure provides an apparatus for fire ventilation and smoke evacuation in a running train tunnel, including:

an acquisition module, configured to, in a case where a fire positioning device detects a fire of a train, acquire a traveling position of the train and a fire position on the train detected by the fire positioning device;

a predicting module, configured to predict all possible stop positions of the train next in various sections of a subway tunnel according to a traveling direction and the traveling position of the train;

a computing module, configured to, according to the fire position, one the basis of a control principle of carrying out smoke evacuation by an air supply and smoke evacuation subsystem in a positive direction of a fire point and carrying out air supply by an air supply and smoke evacuation subsystem in an opposite direction of the fire point, list working state options of the air supply and smoke evacuation subsystems at both ends of each stop position, analyze each working state option, and screen out a target air supply and smoke evacuation subsystem which only carries out smoke evacuation or air supply control from all of the air supply and smoke evacuation subsystems; and a control module, configured to perform linkage control on the target air supply and smoke evacuation subsystem according to the working state option corresponding to the target air supply and smoke evacuation subsystem;

wherein a subway tunnel between two adjacent stations is sequentially divided into a plurality of sections, each section is provided with a fire positioning device and an air supply and smoke evacuation subsystem, and the target air supply and smoke evacuation subsystem is any one of the plurality of air supply and smoke evacuation subsystems.

The present disclosure also provides an electronic device including a memory, a processor and a computer program stored on the memory and executable on the processor, the computer program when executed by the processor implements the method for fire ventilation and smoke evacuation in a running train tunnel as described in any one of the above.

The present disclosure also provides a non-transitory computer readable storage medium having stored thereon a computer program which, when executed by a processor, implements the method for fire ventilation and smoke evacuation in a running train tunnel as described in any one of the above.

The present disclosure also provides a computer program product including a computer program which, when executed by a processor, implements the method for fire ventilation and smoke evacuation in a running train tunnel as described in any one of the above.

The present disclosure provides a method and apparatus for fire ventilation and smoke evacuation in a running train tunnel, when a train traveling within a subway tunnel is on fire, the related air supply and smoke evacuation subsystems in the subway tunnel can be intelligently linked to carry out ventilation and smoke evacuation timely and effectively based on where the train is located in the subway tunnel, the position of the fire point on the train, and all possible stop positions of the train in the various sections of the subway tunnel so as to ensure the rapid evacuation of passengers.

BRIEF DESCRIPTION OF FIGURES

To illustrate the technical solutions in the present disclosure or the prior art more clearly, the accompanying drawings which are required to be used in the description of the embodiments or the prior art will be briefly described, and it is obvious that the accompanying drawings in the following description are some embodiments of the present disclosure, and other drawings can be obtained from these drawings for those skilled in the art without paying inventive step.

REFERENCE SIGNS

1, first station; 2, second station; 3, first tunnel; 4, second tunnel; 5, first air supply and smoke evacuation subsystem; 6, second air supply and smoke evacuation subsystem; 7, third air supply and smoke evacuation subsystem; 8, fourth air supply and smoke evacuation subsystem; 9, fifth air supply and smoke evacuation subsystem; 10, sixth air supply and smoke evacuation subsystem; 11, seventh air supply and smoke evacuation subsystem; 12, eighth air supply and smoke evacuation subsystem; 13, ninth air supply and smoke evacuation subsystem; 14, tenth air supply and smoke evacuation subsystem; 15, eleventh air supply and smoke evacuation subsystem; 16, twelfth air supply and smoke evacuation subsystem;

31, first section; 32, second section; 33, third section; 34, Nth section;

41, first section; 42, (M−2)th section; 43, (M−1)th section; 44, Mth section;

191, first fire positioning device; 192, second fire positioning device; 193, third fire positioning device; 194, Nth fire positioning device;

201, first fire positioning device; 202, (M−2)th fire positioning device; 203, (M−1)th fire positioning device; 204, Mth fire positioning device.

DETAILED DESCRIPTION

In order to make the objectives, technical solutions and advantages of the present disclosure more clear, the technical solutions of the present disclosure will be clearly and completely described in conjunction with the accompanying drawings of the present disclosure, and it is obvious that the described embodiments are some embodiments of the present disclosure, but not all of the embodiments. Based on the embodiments in the present disclosure, all other embodiments obtained by those of ordinary skill in the art without making inventive labor, belong to the scope of protection of the present disclosure.

A method and apparatus for fire ventilation and smoke evacuation in a running train tunnel of the present disclosure are described below with reference to FIGS. 1-5.

Figure 1:
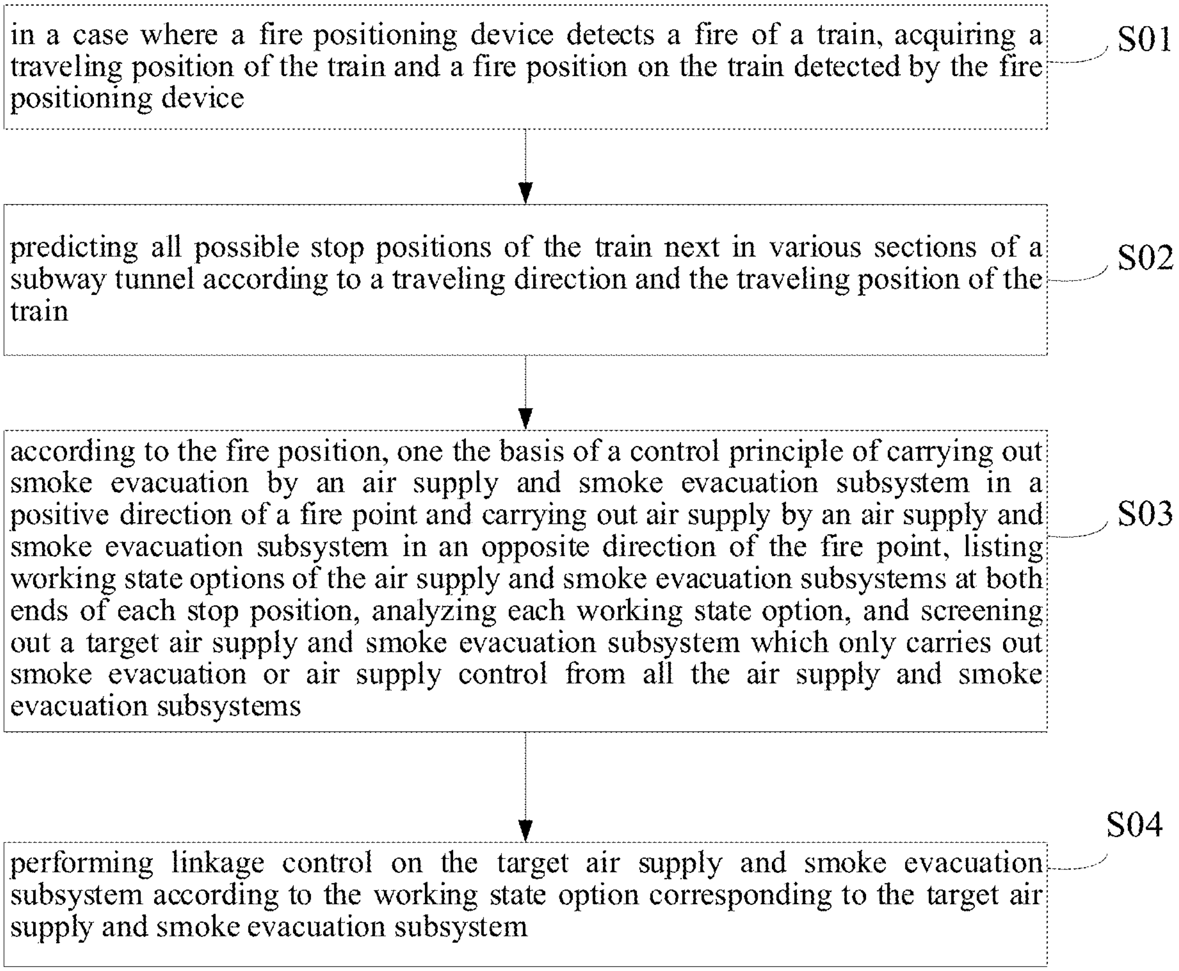
FIG. 1 is a flow schematic diagram of a method for fire ventilation and smoke evacuation in a running train tunnel provided by the present disclosure.

As shown in FIG. 1, the present embodiment provides a method for fire ventilation and smoke evacuation in a running train tunnel, including the steps of:

S01, in a case where a fire positioning device detects a fire of a train, a traveling position of the train and a fire position on the train detected by the fire positioning device are acquired.

S02, all possible stop positions of the train next in various sections of a subway tunnel are predicted according to a traveling direction and the traveling position of the train.

S03, according to the fire position, one the basis of a control principle of carrying out smoke evacuation by an air supply and smoke evacuation subsystem in a positive direction of a fire point and carrying out air supply by an air supply and smoke evacuation subsystem in an opposite direction of the fire point, working state options of the air supply and smoke evacuation subsystems at both ends of each stop position are listed, each working state option is analyzed, and a target air supply and smoke evacuation subsystem which only carries out smoke evacuation or air supply control is screened out from all the air supply and smoke evacuation subsystems.

S04, linkage control is performed on the target air supply and smoke evacuation subsystem according to the working state option corresponding to the target air supply and smoke evacuation subsystem.

When a train traveling within a subway tunnel is on fire, the related air supply and smoke evacuation subsystems in the subway tunnel can be intelligently linked to carry out ventilation and smoke evacuation timely and effectively based on where the train is located in the subway tunnel, the position of the fire point on the train, and all possible stop positions of the train in the various sections of the subway tunnel so as to ensure the rapid evacuation of passengers.

It should be noted here that the present embodiment can perform the above-described ventilation and smoke evacuation method by operating the train tunnel fire ventilation and smoke evacuation system, which can be performed in accordance with the following basic principle of train fire ventilation and smoke evacuation.

The principle of ventilation and smoke evacuation is to open the first air supply and smoke evacuation subsystem from the fire point in the positive direction of the fire point for smoke evacuation, open the first air supply and smoke evacuation subsystem from the fire point in the opposite direction of the fire point to supply air to form an air flow from the opposite direction of the fire point to the positive direction of the fire point, thus ensuring that the non-fire point direction is in a smokeless state and providing conditions for safe evacuation of passengers, and other air supply and smoke evacuation subsystems need to be in a closed state.

Understandably, when a train passes through the fire positioning device during running, the fire positioning device can judge whether a fire occurs on the train based on the collected thermal signals, and feedback the running position of the train and the fire position on the train when a fire occurs on the train is detected.

The fire position on the train can occur at the head or tail of the train. When the fire position is located in the front part of the train, the fire in the front part of the train can be defined as the head fire, and when the fire position is located in the back part of the train, the fire in the back part of the train can be defined as the tail fire.

When the train is composed of an even number of carriages, the fire occurring in the first half of the train is a head fire and the fire occurring in the second half of the train is defined as a tail fire. For example, when the train is composed of eight carriages, the fire occurring in the first four carriages is a head fire and the fire occurring in the last four carriages is a tail fire.

When the train is composed of an odd number of carriages, on the basis of the above classification principle of fire, the fire occurring in the middle carriage of the train can be defined as a tail fire. For example, when the train is composed of seven carriages, the fire occurring in the first three carriages is a head fire, and the fire occurring in the last four carriages is a tail fire.

As such, for the case of a head fire on the train, the current position of the train is taken as a reference, the working state of the first air supply and smoke evacuation subsystem in the subway tunnel in the traveling direction of the train may be determined to be smoke evacuation, the working state of the first air supply and smoke evacuation subsystem in the subway tunnel and deviating from the traveling direction of the train may be determined to be air supply, and the working states of other air supply and smoke evacuation subsystems in the subway tunnel may be closed states.

At the same time, aiming at the fire at the tail of the train, based on the current position of the train, the working state of the first air supply and smoke evacuation subsystem along the traveling direction of the train in the subway tunnel can be determined as air supply, the working state of the first air supply and smoke evacuation subsystem deviating from the traveling direction of the train in the subway tunnel is determined as smoke evacuation, and the working states of other air supply and smoke evacuation subsystems in the subway tunnel are closed states.

It should be noted in the embodiment, a subway tunnel between two adjacent stations can be sequentially divided into a plurality of sections, and each section is provided with a fire positioning device and an air supply and smoke evacuation subsystem. Each of two ends of each state is provided with the air supply and smoke evacuation subsystem and the target air supply and smoke evacuation subsystem is any one of the plurality of air supply and smoke evacuation subsystems.

With respect to a subway tunnel between two stations, the embodiment can divide the subway tunnel into sections according to the arrangement positions of two adjacent fire positioning devices, and can also set a fire positioning device and an air supply and smoke evacuation subsystem in one-to-one correspondence for each section of the subway tunnel.

In this way, when predicting the stop position of the train, the following prediction method can be adopted:

if the train cannot travel to the next fire positioning device, the train will stop within the section behind the fire positioning device.

If the train can travel to the next fire positioning device, but cannot travel to the fire positioning device after next, the train stops at the section between the next fire positioning device and the fire positioning device after next.

Possible stop positions of the train are sequentially listed in the manner described above until the last possible stop position of the train is determined to be the next station.

Figure 2:
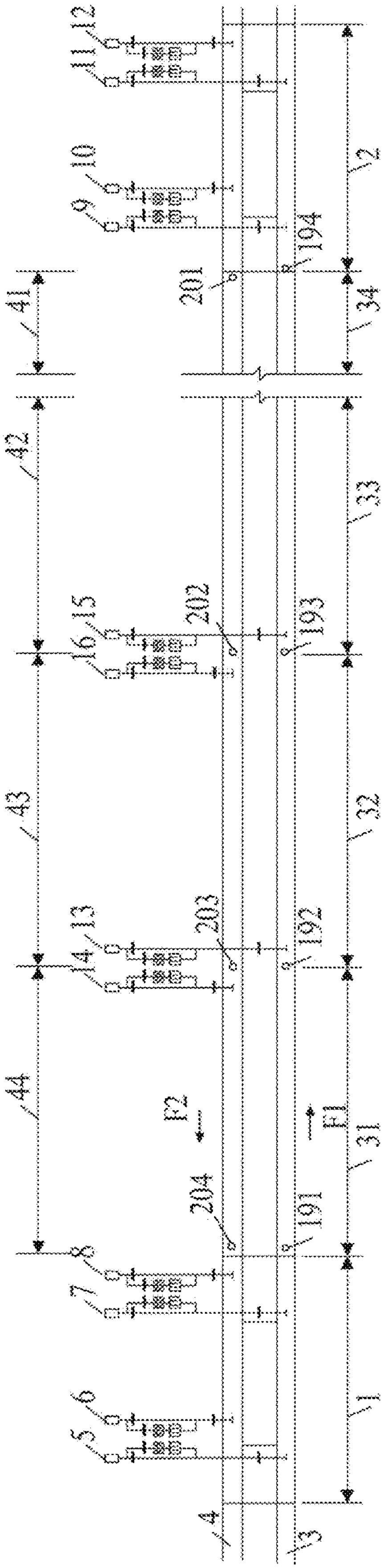
FIG. 2 is a structural schematic diagram of arrangement of a system for fire ventilation and smoke evacuation in a running train tunnel in a subway tunnel provided by the present disclosure.

As shown in FIG. 2, the system of the present embodiment is arranged based on two stations and a subway tunnel provided between the two stations.

Wherein, the two stations are a first station 1 and a second station 2, respectively; two subway tunnels are provided, which are a first tunnel 3 and a second tunnel 4 in turn, and the first tunnel 3 and the second tunnel 4 are arranged in parallel.

Figure 3:
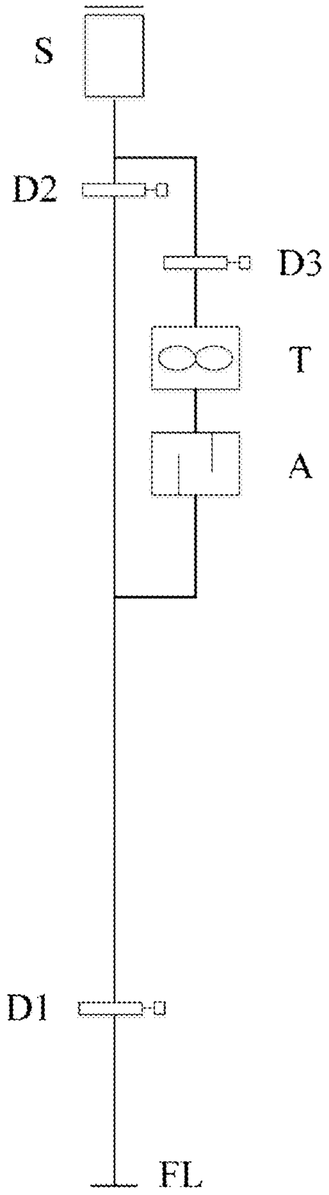
FIG. 3 is a structural schematic diagram of an air supply and smoke evacuation subsystem provided by the present disclosure.

As shown in FIG. 3, each set of the air supply and smoke evacuation subsystem of the present embodiment includes a wind shaft S, an air supply and smoke evacuation fan T, a muffler A, an air supply and smoke evacuation port FL, a first electric blast valve D1, a second electric blast valve D2, and a third electric blast valve D3, and a wind passage connecting the components.

Specifically, the air supply and smoke evacuation port FL is provided in the subway tunnel, the air supply and smoke evacuation port FL, the first electric blast valve D1, the second electric blast valve D2 and the wind shaft S are arranged in a first wind path in sequence, the muffler A, the air supply and smoke evacuation fan T, and the third electric blast valve D3 are sequentially disposed in a second wind path, and one end of the second wind path communicates with the first wind path between the first electric blast valve D1 and the second electric blast valve D2, and the other end of the second wind path communicates with the first wind path between the second electric blast valve D2 and the wind shaft S.

In practical applications, by controlling the first electric blast valve D1 and the second electric blast valve D2 to be opened, sending no start control signal to the air supply and smoke evacuation fan T, and controlling the third electric blast valve D3 to be closed, the air supply and smoke evacuation subsystem is in a closed state, but natural heat evacuation through the first wind path is enabled.

By controlling the second electric blast valve D2 to be closed, controlling the first electric blast valve D1 and the third electric blast valve D3 to be opened, and controlling the air supply and smoke evacuation fan T to rotate forward, the air supply and smoke evacuation subsystem can be brought into a smoke evacuation state.

By controlling the second electric blast valve D2 to be closed, controlling the first electric blast valve D1 and the third electric blast valve D3 to be opened, and controlling the air supply and smoke evacuation fan T to rotate backward, the air supply and smoke evacuation subsystem can be brought into an air supply state.

Based on the solution of the above embodiment, the ventilation and smoke evacuation method of the present embodiment further includes: in a case where the next fire positioning device along the traveling direction detects the passage of the train, linkage control is performed on each air supply and smoke evacuation subsystem again in the order of S01 to S04.

In this manner, the present embodiment enables intelligent and dynamic linkage of the various air supply and smoke evacuation subsystems to provide timely and efficient ventilation and smoke evacuation based on the position of the train, the position of the fire point on the train, and the possible stop position of the train.

In some embodiments, the above step S03 further includes:

- the working state options of the ith air supply and smoke evacuation subsystem when the train is at the jth stop position are listed, both i and j being integers, and i≥1, j≥1; wherein, the working state options include smoke evacuation, air supply and closing;
- in a case where at least one option of smoke evacuation is contained in all the working state options of the ith air supply and smoke evacuation subsystem, and no option of air supply is contained, linkage control is performed on the ith air supply and smoke evacuation subsystem as the target air supply and smoke evacuation subsystem;
- in a case where at least one option of air supply is contained in all the working state options of the ith air supply and smoke evacuation subsystem, and no option of smoke evacuation is contained, linkage control is performed on the ith air supply and smoke evacuation subsystem as the target air supply and smoke evacuation subsystem; and
- in a case where the options of air supply and smoke evacuation are contained in all the working state options of the ith air supply and smoke evacuation subsystem, or in a case where all the working state options of the ith air supply and smoke evacuation subsystem are closed, the ith air supply and smoke evacuation subsystem is closed.

Wherein the present embodiment lists the working state options of the ith air supply and smoke evacuation subsystem when the train is at the jth stop position, so as to query and compare the working state options of each air supply and smoke evacuation subsystem at all stop positions of the train.

In a case where at least one option of smoke evacuation is contained in all the working state options of the ith air supply and smoke evacuation subsystem, and no option of air supply is contained, there may be at least one option of smoke evacuation and a plurality of closed options in all the working state options of the ith air supply and smoke evacuation subsystem, or all the working state options of the ith air supply and smoke evacuation subsystem are smoke evacuation options.

In a case where at least one option of air supply is contained in all the working state options of the ith air supply and smoke evacuation subsystem, and no option of smoke evacuation is contained, there may be at least one option of air supply and a plurality of closed options in all the working state options of the ith air supply and smoke evacuation subsystem, or all the working state options of the ith air supply and smoke evacuation subsystem are air supply options.

In some embodiments, in order to simplify the control flow, the ventilation and smoke evacuation method of the present embodiment further includes: the working state options of the ith air supply and smoke evacuation subsystem are assigned when the train is at the jth stop position according to the category of the working state options; and

- assigned results of the working state options are analyzed to determine a target air supply and smoke evacuation subsystem among the air supply and smoke evacuation subsystems.

In a specific example, the step that the working state options of the ith air supply and smoke evacuation subsystem are assigned when the train is at the jth stop position specifically includes:

- the assigned values of the working state options of the ith air supply and smoke evacuation subsystem when the train is at the jth stop position are set to be $q_{i,j}$;
- wherein, when the working state option is air supply, $q_{i,j}=-K$; when the working state option is smoke evacuation, $q_{i,j}=K$; when the working state option is closing, $q_{i,j}=0$, K is greater than 0.

Here, K may take the value of a positive integer, for example, K may specifically take the value of 1. Of course, K may take other positive integers, which are not particularly limited.

Further, the step that the assigned results of the working state options are analyzed to determine the target air supply and smoke evacuation subsystem among the air supply and smoke evacuation subsystems specifically includes:

- in a case where the assigned values $q_{i,j}$ of all the working state options of the ith air supply and smoke evacuation subsystem are not less than 0, and are not all 0, smoke evacuation control is performed on the ith air supply and smoke evacuation subsystem;
- in a case where the assigned values $q_{i,j}$ of all the working state options of the ith air supply and smoke evacuation subsystem are not greater than 0, and are not all 0, air supply control is performed on the ith air supply and smoke evacuation subsystem; and
- the ith air supply and smoke evacuation subsystem is controlled to be closed when at least one is greater than 0 and at least one is less than 0 occurs among the assigned values $q_{i,j}$ of all the working state options of the ith air supply and smoke evacuation subsystem, or when the assigned values $q_{i,j}$ of all the working state options of the ith air supply and smoke evacuation subsystem are all 0.

In some embodiments, the ventilation and smoke evacuation method of the embodiment further includes: after a preset time, if the next fire positioning device in the traveling direction does not detect the passing of the train, or when it is determined that the train has stopped before reaching the position where the next fire positioning device is located, the first air supply and smoke evacuation subsystem is controlled to carry out smoke evacuation in a positive direction of a fire point and the first air supply and smoke evacuation subsystem is controlled to carry out air supply in an opposite direction of the fire point, while maintaining the current air supply and smoke evacuation state of each of the air supply and smoke evacuation subsystems.

Wherein, in the event that a fire is not detected by the next fire positioning device in the traveling direction after a preset time, it is determined that the train in which the fire has occurred has not passed the next fire positioning device.

In practical applications, the preset time is determined according to the length of the section of the train where the fire occurs and the running speed of the train.

Wherein, the preset time may be 5-15 min, for example, the preset time may be set to be 5 min, 10 min, or 15 min, etc., which is not particularly limited.

Referring now to FIG. 2, a system for fire ventilation and smoke evacuation in a running train tunnel according to the present disclosure is provided.

As shown in FIG. 2, for the first tunnel 3, the traveling direction of the train in the first tunnel 3 can be illustrated with F1. In the traveling direction of the train, a first fire positioning device 191, a second fire positioning device 192, a third fire positioning device 193, . . . , an Nth fire positioning device 194 are provided in sequence within the first tunnel 3, and the first tunnel 3 can be divided into a first section 31, a second section 32, a third section 33, . . . , an Nth section 34.

For the second tunnel 4, the traveling direction of the train in the second tunnel 4 can be illustrated with F2. In the traveling direction of the train, a first fire positioning device 201, . . . , an (M−2)th fire positioning device 202, an (M−1)th fire positioning device 203 and an Mth fire positioning device 204 are provided in sequence within the second tunnel 4, and the second tunnel 4 can be divided into a first section 41, . . . , an (M−2)th section 42, an (M−1)th section 43 and an Mth section 44.

Correspondingly, in the present embodiment, a first air supply and smoke evacuation subsystem 5 and a third air supply and smoke evacuation subsystem 7 are arranged at both ends of the first station 1 corresponding to the first tunnel 3, respectively, and a second air supply and smoke evacuation subsystem 6 and a fourth air supply and smoke evacuation subsystem 8 are arranged at both ends of the first station 1 corresponding to the second tunnel 4, respectively.

A fifth air supply and smoke evacuation subsystem 9 and a seventh air supply and smoke evacuation subsystem 11 are respectively provided at both ends of the corresponding second station 2 of the first tunnel 3, and a sixth air supply and smoke evacuation subsystem 10 and an eighth air supply and smoke evacuation subsystem 12 are respectively provided at both ends of the corresponding second station 2 of the second tunnel 4.

A ninth air supply and smoke evacuation subsystem 13 and an eleventh air supply and smoke evacuation subsystem 15 are also provided in the first tunnel 3 between the two stations, and tenth air supply and smoke evacuation subsystem 14 and a twelfth air supply and smoke evacuation subsystem 16 are also provided in the second tunnel 4 between the two stations.

Based on the above system structure, the method of the present disclosure is illustrated by taking the example that a train travels in the first tunnel 3, and a head fire of the train is detected through the first fire positioning device 191.

(1) A basic principle of ventilation and smoke evacuation of the train fire is set.

The principle of ventilation and smoke evacuation is to open the first air supply and smoke evacuation subsystem from the fire point in the positive direction of the fire point for smoke evacuation, open the first air supply and smoke evacuation subsystem from the fire point in the opposite direction of the fire point to supply air to form an air flow from the opposite direction of the fire point to the positive direction of the fire point, thus ensuring that the non-fire point direction is in a smokeless state and providing conditions for safe evacuation of passengers, and other air supply and smoke evacuation subsystems need to be in a closed state.

(2) When the train traveling in the first tunnel 3 passes the first fire positioning device 191, the first fire positioning device 191 detects that there is a head fire on the train.

(3) All the possible stop positions for the train next between two stations (inclusive) include:

i. The train stops at the first section 31 of the first tunnel 3;

ii. The train stops at the second section 32 of the first tunnel 3;

iii. The train stops at the third section 33 of the first tunnel 3;

iv. The train stops at the Nth section 34 of the first tunnel 3; and v. The train stops at the second station 2.

(4) For each of the above possible stop positions of the train, the working state options of the air supply and smoke evacuation subsystems at both ends of the stop position are given separately. Wherein, the value of K for the above assigned value $q_{i,j}$ is taken as 1.

i. The train stops in the first section 31 of the first tunnel 3, according to the principle of ventilation and smoke evacuation shown in (1), the third air supply and smoke evacuation subsystem 7 should supply air, i.e. $q_{3,1}=-1$, the ninth air supply and smoke evacuation subsystem 13 should evacuate smoke, i.e. $q_{9,1}=1$, other $q_{i,j}=0$.

ii. The train stops in the second section 32 of the first tunnel 3, according to the principle of ventilation and smoke evacuation shown in (1), the ninth air supply and smoke evacuation subsystem 13 should supply air, i.e. $q_{9,2}=-1$, the eleventh air supply and smoke evacuation subsystem 15 should evacuate smoke, i.e. $q_{11,2}=1$, other $q_{i,2}=0$.

iii. The train stops in the third section 33 of the first tunnel 3, then according to the principle of ventilation and smoke evacuation shown in (1), then the eleventh air supply and smoke evacuation subsystem 15 should supply air, i.e. $q_{11,3}=-1$, other $q_{i,3}=0$.

iv. The train stops at the Nth section 34 of the first tunnel 3, then according to the principle of ventilation and smoke evacuation shown in (1), then the fifth air supply and smoke evacuation subsystem 9 should evacuate smoke, i.e. $q_{5,4}=1$, other $q_{i,4}=0$.

v. The train stops at the second station 22, then according to (1), then the fifth air supply and smoke evacuation subsystem 9 should supply air, i.e. $q_{5,5}=-1$, the seventh air supply and smoke evacuation subsystem 11 should evacuate smoke, i.e. $q_{7,5}=1$, other $q_{i,5}=0$.

Thus, the assigned results of the working state options of the ith air supply and smoke evacuation subsystem when the train is at the jth stop position are shown in Table 1 below.

TABLE 1

| $q_{i,j}$ | i = 1 | 2 | 3 | 4 | 5 | 6 | 7 | 8 | 9 | 10 | 11 | 12 |
|---|---|---|---|---|---|---|---|---|---|---|---|---|
| j = 1 | 0 | 0 | −1 | 0 | 0 | 0 | 0 | 0 | 1 | 0 | 0 | 0 |
| 2 | 0 | 0 | 0 | 0 | 0 | 0 | 0 | 0 | −1 | 0 | 1 | 0 |
| 3 | 0 | 0 | 0 | 0 | 0 | 0 | 0 | 0 | 0 | 0 | −1 | 0 |

TABLE 1-continued

| $q_{i,j}$ | i = 1 | 2 | 3 | 4 | 5 | 6 | 7 | 8 | 9 | 10 | 11 | 12 |
|---|---|---|---|---|---|---|---|---|---|---|---|---|
| 4 | 0 | 0 | 0 | 0 | 1 | 0 | 0 | 0 | 0 | 0 | 0 | 0 |
| 5 | 0 | 0 | 0 | 0 | −1 | 0 | 1 | 0 | 0 | 0 | 0 | 0 |

(5) The associated air supply and smoke evacuation subsystems are determined and linked.

According to the previous step, in a case where the assigned values $q_{3,j}$ at all the stop positions of the train are not greater than 0, and are not all 0, the third air supply and smoke evacuation subsystem 7 is jointly opened for air supply; in a case where the assigned values $q_{7,j}$ at all the stop positions of the train are not less than 0, and are not all 0, the seventh air supply and smoke evacuation subsystem 11 is jointly opened for fume evacuation, and other air supply and smoke evacuation subsystems are in the closed state.

(3-1) If the train travels through the next fire positioning device, i.e. the train in the first tunnel 3 passes the second fire positioning device 192, then all the possible stop positions for the train next between two stations (inclusive) include:

i. The train stops at the second section 32 of the first tunnel 3;

ii. The train stops at the third section 33 of the first tunnel 3;

iii. The train stops at the Nth section 34 of the first tunnel 3;

iv. The train stops at the second station 2.

(4-1) For each of the above possible stop positions of the train, the working state options of the air supply and smoke evacuation subsystems at both ends of the stop position are given separately.

i. The train stops in the second section 32 of the first tunnel 3, according to the principle of ventilation and smoke evacuation shown in (1), the ninth air supply and smoke evacuation subsystem 13 should supply air, i.e. $q_{9,1}=-1$, the eleventh air supply and smoke evacuation subsystem 15 should evacuate smoke, i.e. $q_{i,1}=1$, other $q_{i,2}=0$.

ii. The train stops in the third section 33 of the first tunnel 3, according to the principle of ventilation and smoke evacuation shown in (1), the eleventh air supply and smoke evacuation subsystem 15 should supply air, i.e. $q_{11,2}=-1$, and other $q_{i,2}=0$.

iii. The train stops in the Nth section 34 of the first tunnel 3, then according to the principle of ventilation and smoke evacuation shown in (1), the fifth air supply and smoke evacuation subsystem 9 should evacuate smoke, i.e. $q_{5,3}=1$, other $q_{i,3}=0$.

iv. The train stops at the second station 2, then according to (1), then the fifth air supply and smoke evacuation subsystem 9 should supply air, i.e. $q_{5,4}=-1$, the seventh air supply and smoke evacuation subsystem 11 should evacuate smoke, i.e. $q_{7,4}=1$, other $q_{i,4}=0$.

Thus, the assigned results of the working state options of the ith air supply and smoke evacuation subsystem when the train is at the jth stop position are shown in Table 2 below.

TABLE 2

| $q_{i,j}$ | i = 1 | 2 | 3 | 4 | 5 | 6 | 7 | 8 | 9 | 10 | 11 | 12 |
|---|---|---|---|---|---|---|---|---|---|---|---|---|
| j = 1 | 0 | 0 | 0 | 0 | 0 | 0 | 0 | 0 | −1 | 0 | 1 | 0 |
| 2 | 0 | 0 | 0 | 0 | 0 | 0 | 0 | 0 | 0 | 0 | −1 | 0 |
| 3 | 0 | 0 | 0 | 0 | 1 | 0 | 0 | 0 | 0 | 0 | 0 | 0 |
| 4 | 0 | 0 | 0 | 0 | −1 | 0 | 1 | 0 | 0 | 0 | 0 | 0 |

(5-1) The associated air supply and smoke evacuation subsystems are determined and linked.

According to the previous step, in a case where the assigned values $q_{9,j}$ at all the stop positions of the train are not greater than 0, and are not all 0, the ninth air supply and smoke evacuation subsystem 13 is jointly opened for air supply; in a case where the assigned values $q_{7,j}$ at all the stop positions of the train are not less than 0, and are not all 0, the seventh air supply and smoke evacuation subsystem 11 is jointly opened for fume evacuation, and other air supply and smoke evacuation subsystems are in the closed state.

Considering that the seventh air supply and smoke evacuation subsystem 11 has already been opened for smoke evacuation, immediately after the train in the first tunnel 3 passes the second fire positioning device 192, the ninth air supply and smoke evacuation subsystem 13 is jointly opened to supply air.

(3-2) If the train travels through the next fire positioning device, i.e. the train in the first tunnel 3 passes the third fire positioning device 193, then all the possible stop positions for the train next between two stations (inclusive) include:

i. The train stops at the third section 33 of the first tunnel 3;

ii. The train stops at the Nth section 34 of the first tunnel 3;

iii. The train stops at the second station 2.

(4-2) For each of the above possible stop positions of the train, the working state options of the air supply and smoke evacuation subsystems at both ends of the stop position are given separately.

i. The train stops in the third section 33 of the first tunnel 3, according to the principle of ventilation and smoke evacuation shown in (1), the eleventh air supply and smoke evacuation subsystem 15 should supply air, i.e. $q_{11,1}=-1$, and other $q_{i,1}=0$.

ii. The train stops in the Nth section 34 of the first tunnel 3, then according to the principle of ventilation and smoke evacuation shown in (1), the fifth air supply and smoke evacuation subsystem 9 should evacuate smoke, i.e. $q_{5,2}=1$, other $q_{i,2}=0$.

iii. The train stops at the second station 2, then according to the principle of ventilation and smoke evacuation shown in (1), the fifth air supply and smoke evacuation subsystem 9 should supply air, i.e. $q_{5,3}=-1$, the seventh air supply and smoke evacuation subsystem 11 should evacuate smoke, i.e. $q_{7,3}=1$, other $q_{i,3}=0$.

Thus, the assigned results of the working state options of the ith air supply and smoke evacuation subsystem when the train is at the jth stop position are shown in Table 3 below.

TABLE 3

| $q_{i,j}$ | i = 1 | 2 | 3 | 4 | 5 | 6 | 7 | 8 | 9 | 10 | 11 | 12 |
|---|---|---|---|---|---|---|---|---|---|---|---|---|
| j = 1 | 0 | 0 | 0 | 0 | 0 | 0 | 0 | 0 | 0 | 0 | −1 | 0 |
| 2 | 0 | 0 | 0 | 0 | 1 | 0 | 0 | 0 | 0 | 0 | 0 | 0 |
| 3 | 0 | 0 | 0 | 0 | −1 | 0 | 1 | 0 | 0 | 0 | 0 | 0 |

(5-2) The associated air supply and smoke evacuation subsystems are determined and linked.

According to the previous step, in a case where the assigned values $q_{11,j}$ at all the stop positions of the train are not greater than 0, and are not all 0, the eleventh air supply and smoke evacuation subsystem 15 is jointly opened for air supply; in a case where the assigned values $q_{7,j}$ at all the stop positions of the train are not less than 0, and are not all 0, the seventh air supply and smoke evacuation subsystem 11 is jointly opened for fume evacuation, and other air supply and smoke evacuation subsystems are in the closed state.

Considering that the seventh air supply and smoke evacuation subsystem 11 has already been opened for smoke evacuation, immediately after the train in the first tunnel 3 passes the third fire positioning device 193, the eleventh air supply and smoke evacuation subsystem 15 is jointly opened to supply air.

(3-3) If the train travels through the next fire positioning device, i.e. the train in the first tunnel 3 passes the Nth fire positioning device 194, then all the possible stop positions for the train next between two stations (inclusive) include:

i. The train stops at the second station 22.

(4-3) For each of the above possible stop positions of the train, the working state options of the air supply and smoke evacuation subsystems at both ends of the stop position are given separately.

i. The train stops at the second station 2, then according to the principle of ventilation and smoke evacuation shown in (1), the fifth air supply and smoke evacuation subsystem 9 should supply air, i.e. $q_{5,1}=-1$, the seventh air supply and smoke evacuation subsystem 11 should evacuate smoke, i.e. $q_{7,1}=1$, other $q_{i,1}=0$.

Thus, the assigned results of the working state options of the ith air supply and smoke evacuation subsystem when the train is at the jth stop position are shown in Table 4 below.

TABLE 4

| $q_{i,j}$ | i = 1 | 2 | 3 | 4 | 5 | 6 | 7 | 8 | 9 | 10 | 11 | 12 |
|---|---|---|---|---|---|---|---|---|---|---|---|---|
| j = 1 | 0 | 0 | 0 | 0 | −1 | 0 | 1 | 0 | 0 | 0 | 0 | 0 |

(5-3) The associated air supply and smoke evacuation subsystems are determined and linked.

According to the previous step, in a case where the assigned values $q_{5,j}$ at all the stop positions of the train are not greater than 0, and are not all 0, the fifth air supply and smoke evacuation subsystem 9 is jointly opened for air supply; in a case where the assigned values $q_{7,j}$ at all the stop positions of the train are not less than 0, and are not all 0, the seventh air supply and smoke evacuation subsystem 11 is jointly opened for fume evacuation, and other air supply and smoke evacuation subsystems are in the closed state.

Considering that the seventh air supply and smoke evacuation subsystem 11 has already been opened for smoke evacuation, immediately after the train in the first tunnel 3 passes the Nth fire positioning device 194, the fifth air supply and smoke evacuation subsystem 9 is jointly opened to supply air.

(7) If the train in the first tunnel 3 passes the first fire positioning device 191, and does not pass the second fire positioning device 192 within 10 minutes, or if it is manually confirmed that the train stops in the first section 31 of the first tunnel 3, the first air supply and smoke evacuation subsystem in the direction of the fire point (the ninth air supply and smoke evacuation subsystem 13) is manually opened for smoke evacuation, and the first air supply and smoke evacuation subsystem in the direction opposite to the fire point (the third air supply and smoke evacuation subsystem 7) is opened for air supply.

Considering that the third air supply and smoke evacuation subsystem 7 has already been opened for air supply in step (5), therefore, only the ninth air supply and smoke evacuation subsystem 13 is needed to be opened to evacuate smoke.

(7-1) If the train in the first tunnel 3 passes the second fire positioning device 192, and does not pass the third fire positioning device 193 within 10 minutes, or if it is manually confirmed that the train stops in the second section 32 of the first tunnel 3, the first air supply and smoke evacuation subsystem in the direction of the fire point (the eleventh air supply and smoke evacuation subsystem 15) is manually opened for smoke evacuation, and the first air supply and smoke evacuation subsystem in the direction opposite to the fire point (the ninth air supply and smoke evacuation subsystem 13) is opened for air supply.

Considering that the third air supply and smoke evacuation subsystem 7, the ninth air supply and smoke evacuation subsystem 13, and the seventh air supply and smoke evacuation subsystem 11 have already been opened for smoke evacuation in step (5) and step (5-1), therefore, only the eleventh air supply and smoke evacuation subsystem 15 is needed to be opened to evacuate smoke.

(7-2) If the train in the first tunnel 3 passes the third fire positioning device 193, and does not pass the Nth fire positioning device 194 within 10 minutes, or if it is manually confirmed that the train stops in the third section 33 of the first tunnel 3, the first air supply and smoke evacuation subsystem in the direction of the fire point is manually opened for smoke evacuation, and if there are no more air supply and smoke evacuation subsystems between the third section 33 and the Nth section 34, the first air supply and smoke evacuation subsystem in the direction of the fire point is the fifth air supply and smoke evacuation subsystem 9, and the first air supply and smoke evacuation subsystem in the direction opposite to the fire point (the eleventh air supply and smoke evacuation subsystem 15) is opened for air supply.

Considering that the third air supply and smoke evacuation subsystem 7, the ninth air supply and smoke evacuation subsystem 13, and the eleventh air supply and smoke evacuation subsystem 15 have already been opened for air supply in step (5), step (5-1) and step (5-2), and the seventh air supply and smoke evacuation subsystem 11 is opened to evacuate smoke, therefore, only the fifth air supply and smoke evacuation subsystem 9 is needed to be opened to evacuate smoke.

(7-3) If the train in the first tunnel 3 passes the Nth fire positioning device 194, and does not pass the next fire positioning device within 10 minutes, or if it is manually confirmed that the train stops in the second station 2, the first air supply and smoke evacuation subsystem (the seventh air supply and smoke evacuation subsystem 11) in the direction of the fire point is opened for smoke evacuation, and the first air supply and smoke evacuation subsystem in the direction opposite to the fire point (the fifth air supply and smoke evacuation subsystem 9) is opened for air supply.

Considering that the third air supply and smoke evacuation subsystem 7, the ninth air supply and smoke evacuation subsystem 13, the eleventh air supply and smoke evacuation subsystem 15, and the fifth air supply and smoke evacuation subsystem 9 have already been opened for air supply in step (5), step (5-1), step (5-2) and step (5-3), after the seventh air supply and smoke evacuation subsystem 11 is opened to evacuate smoke, there is no need to open any air supply and smoke evacuation subsystem.

The apparatus for fire ventilation and smoke evacuation in a running train tunnel provided by the present disclosure is described below, and the apparatus for fire ventilation and smoke evacuation in a running train tunnel described below and the method for fire ventilation and smoke evacuation in a running train tunnel described above can be cross-referenced.

Figure 4:
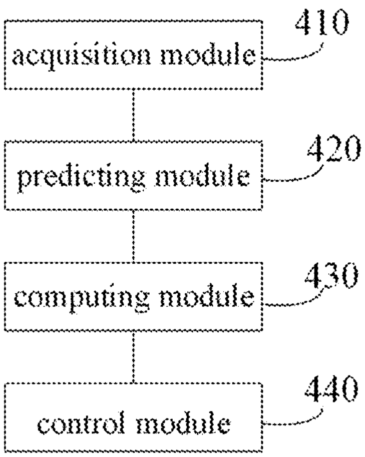
FIG. 4 is a structural schematic diagram of an apparatus for fire ventilation and smoke evacuation in a running train tunnel provided by the present disclosure.

As shown in FIG. 4, the present embodiment also provides an apparatus for fire ventilation and smoke evacuation in a running train tunnel, including the following modules:

an acquisition module 410, configured to, in a case where a fire positioning device detects a fire of a train, acquire a traveling position of the train and a fire position on the train detected by the fire positioning device;

a predicting module 420, configured to predict all possible stop positions of the train next in various sections of a subway tunnel according to a traveling direction and the traveling position of the train;

a computing module 430, configured to, according to the fire position, one the basis of a control principle of carrying out smoke evacuation by an air supply and smoke evacuation subsystem in a positive direction of a fire point and carrying out air supply by an air supply and smoke evacuation subsystem in an opposite direction of the fire point, list working state options of the air supply and smoke evacuation subsystems at both ends of each stop position, analyze each working state option, and screen out a target air supply and smoke evacuation subsystem which only carries out smoke evacuation or air supply control from all of the air supply and smoke evacuation subsystems; and a control module 440, configured to perform linkage control on the target air supply and smoke evacuation subsystem according to the working state option corresponding to the target air supply and smoke evacuation subsystem;

wherein a subway tunnel between two adjacent stations is sequentially divided into a plurality of sections, each section is provided with a fire positioning device and an air supply and smoke evacuation subsystem, and the target air supply and smoke evacuation subsystem is any one of the plurality of air supply and smoke evacuation subsystems.

When a train traveling within a subway tunnel is on fire, the related air supply and smoke evacuation subsystems in the subway tunnel can be intelligently linked to carry out ventilation and smoke evacuation timely and effectively based on where the train is located in the subway tunnel, the position of the fire point on the train, and all possible stop positions of the train in the various sections of the subway tunnel so as to ensure the rapid evacuation of passengers.

Figure 5:
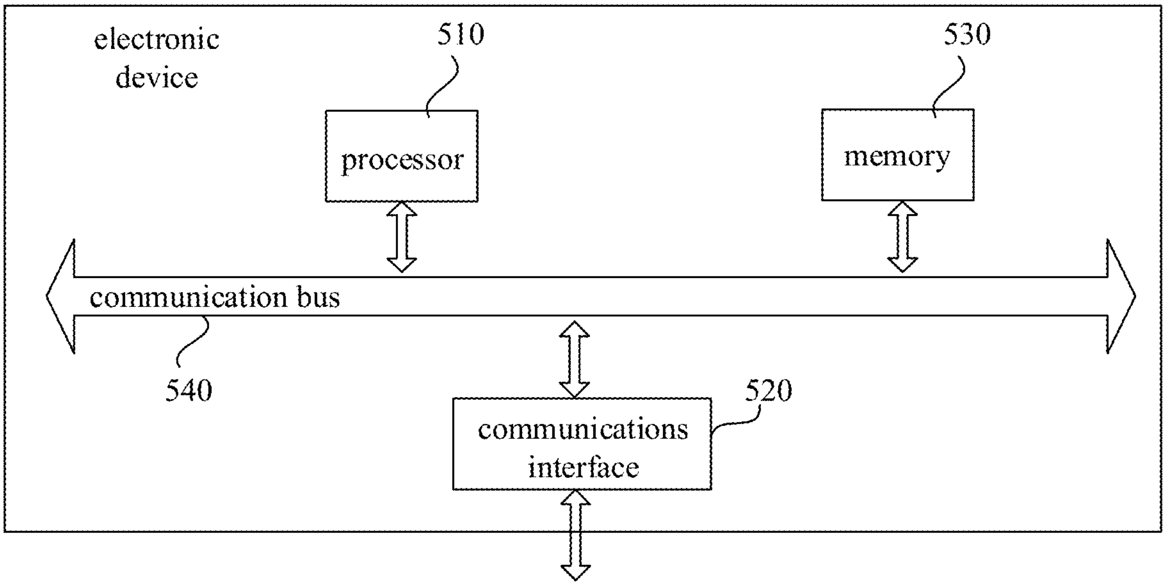
FIG. 5 is a structural schematic diagram of an electronic device provided by the present disclosure.

FIG. 5 is a schematic diagram of a physical structure of an electronic device, and as shown in FIG. 5, the electronic device may include a processor 510, a communications interface 520, a memory 530, and a communication bus 540, wherein the processor 510, the communications interface 520, and the memory 530 communicate with each other via the communication bus 540. The processor 510 may invoke the logic instructions in the memory 530 to perform the method for fire ventilation and smoke evacuation in a running train tunnel, and the method includes: in a case where a fire positioning device detects a fire of a train, a traveling position of the train and a fire position on the train detected by the fire positioning device are acquired; all possible stop positions of the train next in various sections of a subway tunnel are predicted according to a traveling direction and the traveling position of the train; according to the fire position, one the basis of a control principle of carrying out smoke evacuation by an air supply and smoke evacuation subsystem in a positive direction of a fire point and carrying out air supply by an air supply and smoke evacuation subsystem in an opposite direction of the fire point, working state options of the air supply and smoke evacuation subsystems at both ends of each stop position are listed, each working state option is analyzed, and a target air supply and smoke evacuation subsystem which only carries out smoke evacuation or air supply control is screened out from all the air supply and smoke evacuation subsystems; and linkage control is performed on the target air supply and smoke evacuation subsystem according to the working state option corresponding to the target air supply and smoke evacuation subsystem; wherein a subway tunnel between two adjacent stations is sequentially divided into a plurality of sections, each section is provided with a fire positioning device and an air supply and smoke evacuation subsystem, and the target air supply and smoke evacuation subsystem is any one of the plurality of air supply and smoke evacuation subsystems.

Further, the logic instructions in the memory 530 described above may be implemented in the form of functional units of software and may be stored in a computer readable storage medium when sold or used as a stand-alone product. Based on such understanding, the technical solution of the present disclosure in essence or the part contributing to the prior art or the part of the technical solution can be embodied in the form of a software product, the computer software product is stored in a storage medium and includes instructions for causing a computer device (which may be a personal computer, a server, a network device, or the like) to perform all or part of the steps of the method according to the various embodiments of the present disclosure. The aforementioned storage medium can be any medium in which program codes can be stored, such as a U disk, a removable hard disk, a Read-Only Memory (ROM), a Random Access Memory (RAM), a magnetic disk, or an optical disk.

On the other hand, the disclosure also provides a computer program product, the computer program product including a computer program, the computer program may be stored on a non-transitory computer-readable storage medium, when the computer program is executed by a processor, the computer is capable of performing the method for fire ventilation and smoke evacuation in a running train tunnel provided by each of the above methods, and the method includes: in a case where a fire positioning device detects a fire of a train, a traveling position of the train and a fire position on the train detected by the fire positioning device are acquired; all possible stop positions of the train next in various sections of a subway tunnel are predicted according to a traveling direction and the traveling position of the train; according to the fire position, one the basis of a control principle of carrying out smoke evacuation by an air supply and smoke evacuation subsystem in a positive direction of a fire point and carrying out air supply by an air supply and smoke evacuation subsystem in an opposite direction of the fire point, working state options of the air supply and smoke evacuation subsystems at both ends of each stop position are listed, each working state option is analyzed, and a target air supply and smoke evacuation subsystem which only carries out smoke evacuation or air supply control is screened out from all the air supply and smoke evacuation subsystems; and linkage control is performed on the target air supply and smoke evacuation subsystem according to the working state option corresponding to the target air supply and smoke evacuation subsystem; wherein a subway tunnel between two adjacent stations is sequentially divided into a plurality of sections, each section is provided with a fire positioning device and an air supply and smoke evacuation subsystem, and the target air supply and smoke evacuation subsystem is any one of the plurality of air supply and smoke evacuation subsystems.

In yet another aspect, the present disclosure also provides a non-transitory computer readable storage medium, having a computer program stored thereon, the computer program, when executed by a processor, implements the method for fire ventilation and smoke evacuation in a running train tunnel provided by each of the above methods, and the method includes: in a case where a fire positioning device detects a fire of a train, a traveling position of the train and a fire position on the train detected by the fire positioning device are acquired; all possible stop positions of the train next in various sections of a subway tunnel are predicted according to a traveling direction and the traveling position of the train; according to the fire position, one the basis of a control principle of carrying out smoke evacuation by an air supply and smoke evacuation subsystem in a positive direction of a fire point and carrying out air supply by an air supply and smoke evacuation subsystem in an opposite direction of the fire point, working state options of the air supply and smoke evacuation subsystems at both ends of each stop position are listed, each working state option is analyzed, and a target air supply and smoke evacuation subsystem which only carries out smoke evacuation or air supply control is screened out from all the air supply and smoke evacuation subsystems; and linkage control is performed on the target air supply and smoke evacuation subsystem according to the working state option corresponding to the target air supply and smoke evacuation subsystem; wherein a subway tunnel between two adjacent stations is sequentially divided into a plurality of sections, each section is provided with a fire positioning device and an air supply and smoke evacuation subsystem, and the target air supply and smoke evacuation subsystem is any one of the plurality of air supply and smoke evacuation subsystems.

The apparatus embodiments described above are merely illustrative, wherein the units illustrated as separate components may or may not be physically separated, and the components illustrated as units may or may not be physical units, i.e. may be located at one place or may be distributed over a plurality of network elements. Some or all of the modules may be selected according to actual needs to achieve the objective of the embodiment. Those of ordinary skill in the art can understand and implement without inventive effort.

From the above description of the embodiments, it will be clear to those skilled in the art that the embodiments can be implemented by means of software plus a necessary general hardware platform, but of course also by means of hardware. Based on such understanding, the above technical solution in essence or the part contributing to the prior art can be embodied in the form of a software product, the computer software product may be stored in a computer readable storage medium, such as a ROM/RAM, a magnetic disk, an optical disk, or the like, and includes instructions for causing a computer device (which may be a personal computer, a server, a network device, or the like) to perform the methods of the various embodiments or portions of the embodiments.

Finally, it should be described that the above embodiments are only used to illustrate the technical solution of the present disclosure, but not to limit it. Although the present disclosure has been described in detail with reference to the foregoing embodiments, it will be understood by those of ordinary skill in the art that the technical solution described in the foregoing embodiments can still be modified or some technical features thereof can be equivalently substituted. These modifications or substitutions do not make the essence of the corresponding technical solution depart from the spirit and scope of the technical solution of the embodiments of the present disclosure.

What is claimed is:

1. A method for fire ventilation and smoke evacuation in a running train tunnel, comprising:

S01, in response to at least one thermal detector of a plurality of thermal detectors detecting a fire of a train, acquiring a traveling position of the train and a fire position on the train detected by the at least one thermal detector;

S02, selecting all possible stop sections of the train next in various sections of a subway tunnel according to a traveling direction and the traveling position of the train;

S03, according to the fire position, on a basis of a control principle of carrying out smoke evacuation by one of first air supply and smoke evacuation subsystems in a positive direction of a fire point and carrying out air supply by one of second air supply and smoke evacuation subsystems in an opposite direction of the fire point, listing working state options of the first air supply and smoke evacuation subsystems and the second air supply and smoke evacuation subsystems at both ends of each stop section, analyzing each working state option, and selecting, respectively from the first air supply and smoke evacuation subsystems and the second air supply and smoke evacuation subsystems, a first target air supply and smoke evacuation subsystem which only carries out smoke evacuation control and a second target air supply and smoke evacuation subsystem which only carries out air supply control; and S04, performing linkage control on the first target air supply and smoke evacuation subsystem and the second target air supply and smoke evacuation subsystem according to the working state option corresponding to the first target air supply and smoke evacuation subsystem and the second target air supply and smoke evacuation subsystem;

wherein a subway tunnel between two adjacent stations is sequentially divided into a plurality of sections, each section is provided with the at least one thermal detector and an air supply and smoke evacuation subsystem, and the first target air supply and smoke evacuation subsystem or the second target air supply and smoke evacuation subsystem is any one of a plurality of air supply and smoke evacuation subsystems; the opposite direction is the traveling direction, and the opposite direction is a direction opposite to the traveling direction, and wherein S03 further comprises:

listing the working state options of the ith air supply and smoke evacuation subsystem when the train is at the jth stop section, both i and j being integers, and i≥1, j≥1; wherein, the working state options comprise smoke evacuation, air supply and closing;

determining the working state options contained in the ith air supply and smoke evacuation subsystem;

in response to determining that at least one option of smoke evacuation is contained in the working state options of the ith air supply and smoke evacuation subsystem, and that no option of air supply is contained in the working state options of the ith air supply and smoke evacuation subsystem, performing linkage control on the ith air supply and smoke evacuation subsystem as the first target air supply and smoke evacuation subsystem;

in response to determining that at least one option of air supply is contained in the working state options of the ith air supply and smoke evacuation subsystem, and that no option of smoke evacuation is contained in the working state options of the ith air supply and smoke evacuation subsystem, performing linkage control on the ith air supply and smoke evacuation subsystem as the second target air supply and smoke evacuation subsystem; and in response to determining that at least one option of air supply and at least one option of smoke evacuation are both contained in the working state options of the ith air supply and smoke evacuation subsystem, or that neither an option of air supply nor an option of smoke evacuation are contained in the working state options of the ith air supply and smoke evacuation subsystem, closing the ith air supply and smoke evacuation subsystem.

2. The method for fire ventilation and smoke evacuation in a running train tunnel according to claim 1, further comprising:

in a case where one in response to a thermal detector of the plurality of thermal detectors along the traveling direction detects detecting the passage of the train, performing linkage control on each of the plurality of air supply and smoke evacuation subsystems again in the order of S01 to S04.

3. The method for fire ventilation and smoke evacuation in a running train tunnel according to claim 1, further comprising:

assigning the working state options of the ith air supply and smoke evacuation subsystem when the train is at the jth stop section according to the category of the working state options; and analyzing assigned results of the working state options to determine the first target air supply and smoke evacuation subsystem and the second target air supply and smoke evacuation subsystem among the plurality of air supply and smoke evacuation subsystems.

4. The method for fire ventilation and smoke evacuation in a running train tunnel according to claim 3, wherein assigning the working state options of the ith air supply and smoke evacuation subsystem when the train is at the jth stop section comprises:

setting the assigned values of the working state options of the ith air supply and smoke evacuation subsystem when the train is at the jth stop section to be $q_{i,j}$;

wherein, when the working state option is air supply, $q_{i,j}=-K$; when the working state option is smoke evacuation, $q_{i,j}=K$; when the working state option is closing, $q_{i,j}=0$, K is greater than 0.

5. The method for fire ventilation and smoke evacuation in a running train tunnel according to claim 4, wherein analyzing the assigned results of the working state options to determine the first target air supply and smoke evacuation subsystem and the second target air supply and smoke evacuation subsystem among the plurality of air supply and smoke evacuation subsystems comprises:

determining the assigned values qui of the working state options of the ith air supply and smoke evacuation subsystem;

in response to determining that the assigned values $q_{i,j}$ of the working state options of the ith air supply and smoke evacuation subsystem are not less than 0, and are not all 0, performing smoke evacuation control on the ith air supply and smoke evacuation subsystem;

in response to determining that the assigned values $q_{i,j}$ of the working state options of the ith air supply and smoke evacuation subsystem are not greater than 0, and are not all 0, performing air supply control on the ith air supply and smoke evacuation subsystem; and in response to determining that at least one of the assigned values $q_{i,j}$ of the working state options of the ith air supply and smoke evacuation subsystem is greater than 0 and at least one of the assigned values $q_{i,j}$ of the working state options of the ith air supply and smoke evacuation subsystem is less than 0, or that the assigned values $q_{i,j}$ of all of the working state options of the ith air supply and smoke evacuation subsystem are 0, controlling the ith air supply and smoke evacuation subsystem to be closed.

6. The method for fire ventilation and smoke evacuation in a running train tunnel according to claim 1, further comprising:

after a preset time, if one thermal detector of the plurality of thermal detectors in the traveling direction does not detect the passing of the train, controlling the first air supply and smoke evacuation subsystem to carry out smoke evacuation in a positive direction of a fire point and controlling the first air supply and smoke evacuation subsystem to carry out air supply in an opposite direction of the fire point, while maintaining the current air supply and smoke evacuation state of each of the plurality of air supply and smoke evacuation subsystems.

7. The method for fire ventilation and smoke evacuation in a running train tunnel according to claim 2, further comprising:

after a preset time, if one thermal detector of the plurality of thermal detectors in the traveling direction does not detect the passing of the train, controlling the first air supply and smoke evacuation subsystem to carry out smoke evacuation in a positive direction of a fire point and controlling the first air supply and smoke evacuation subsystem to carry out air supply in an opposite direction of the fire point, while maintaining the current air supply and smoke evacuation state of each of the plurality of air supply and smoke evacuation subsystems.

8. The method for fire ventilation and smoke evacuation in a running train tunnel according to claim 3, further comprising:

after a preset time, if one thermal detector of the plurality of thermal detectors in the traveling direction does not detect the passing of the train, controlling the first air supply and smoke evacuation subsystem to carry out smoke evacuation in a positive direction of a fire point and controlling the first air supply and smoke evacuation subsystem to carry out air supply in an opposite direction of the fire point, while maintaining the current air supply and smoke evacuation state of each of the plurality of air supply and smoke evacuation subsystems.

9. The method for fire ventilation and smoke evacuation in a running train tunnel according to claim 4, further comprising:

after a preset time, if one thermal detector of the plurality of thermal detectors in the traveling direction does not detect the passing of the train, controlling the first air supply and smoke evacuation subsystem to carry out smoke evacuation in a positive direction of a fire point and controlling the first air supply and smoke evacuation subsystem to carry out air supply in an opposite direction of the fire point, while maintaining the current air supply and smoke evacuation state of each of the plurality of air supply and smoke evacuation subsystems.

10. The method for fire ventilation and smoke evacuation in a running train tunnel according to claim 5, further comprising:

after a preset time, if one thermal detector of the plurality of thermal detectors in the traveling direction does not detect the passing of the train, controlling the first air supply and smoke evacuation subsystem to carry out smoke evacuation in a positive direction of a fire point and controlling the first air supply and smoke evacuation subsystem to carry out air supply in an opposite direction of the fire point, while maintaining the current air supply and smoke evacuation state of each of the plurality of air supply and smoke evacuation subsystems.

11. The method for fire ventilation and smoke evacuation in a running train tunnel according to claim 6, wherein the preset time is determined according to the length of the section of the train where the fire occurs and the running speed of the train.

12. The method for fire ventilation and smoke evacuation in a running train tunnel according to claim 7, wherein the preset time is determined according to the length of the section of the train where the fire occurs and the running speed of the train.

13. The method for fire ventilation and smoke evacuation in a running train tunnel according to claim 8, wherein the preset time is determined according to the length of the section of the train where the fire occurs and the running speed of the train.

14. The method for fire ventilation and smoke evacuation in a running train tunnel according to claim 9, wherein the preset time is determined according to the length of the section of the train where the fire occurs and the running speed of the train.

15. The method for fire ventilation and smoke evacuation in a running train tunnel according to claim 10, wherein the preset time is determined according to the length of the section of the train where the fire occurs and the running speed of the train.

16. An electronic device, comprising a memory, a processor and a computer program stored on the memory and executable on the processor, wherein the computer program when executed by the processor implements the method for fire ventilation and smoke evacuation in a running train tunnel according to claim 1.

* * * * *